United States Patent
Rosenfeld et al.

(10) Patent No.: US 6,901,377 B1
(45) Date of Patent: May 31, 2005

(54) METHODS AND SYSTEMS FOR AVIATION PARTS, INFORMATION AND SERVICES

(75) Inventors: John Richard Rosenfeld, Mason, OH (US); John Randall Nelson, West Chester, OH (US); Melinda Kay Fredette, Cincinnati, OH (US); Herman David Overbeeke, Loveland, OH (US)

(73) Assignee: General Electric Company, Schenectady, NY (US)

( * ) Notice: Subject to any disclaimer, the term of this patent is extended or adjusted under 35 U.S.C. 154(b) by 653 days.

(21) Appl. No.: 09/724,124

(22) Filed: Nov. 28, 2000

Related U.S. Application Data

(60) Provisional application No. 60/175,178, filed on Jan. 7, 2000.

(51) Int. Cl.$^7$ .............................................. G06F 17/60
(52) U.S. Cl. ......................................... 705/26; 705/27
(58) Field of Search ...................................... 705/26, 27

(56) References Cited

U.S. PATENT DOCUMENTS

| | | | |
|---|---|---|---|
| 4,404,639 A | * | 9/1983 | McGuire et al. ............... 701/35 |
| 5,253,341 A | | 10/1993 | Rozmanith et al. |
| 5,528,490 A | | 6/1996 | Hill |
| 5,544,320 A | | 8/1996 | Konrad |
| 5,666,493 A | | 9/1997 | Wojcik et al. |
| 5,696,901 A | | 12/1997 | Konrad |
| 5,710,887 A | | 1/1998 | Chelliah et al. |
| 5,717,595 A | * | 2/1998 | Cherrington et al. ....... 705/400 |
| 5,761,662 A | | 6/1998 | Dasan |
| 5,778,381 A | * | 7/1998 | Sandifer ................... 707/104.1 |
| 5,884,309 A | | 3/1999 | Vanechanos, Jr. |
| 5,931,877 A | * | 8/1999 | Smith et al. ................... 701/29 |
| 5,940,075 A | | 8/1999 | Mutschler, III et al. |
| 5,946,695 A | | 8/1999 | Hinrichs et al. |
| 5,953,707 A | | 9/1999 | Huang et al. |
| 5,970,475 A | | 10/1999 | Barnes et al. |
| 5,974,444 A | | 10/1999 | Konrad |
| 5,987,480 A | | 11/1999 | Donohue et al. |
| 6,003,808 A | * | 12/1999 | Nguyen et al. ............. 244/1 R |
| 6,067,486 A | * | 5/2000 | Aragones et al. ............. 701/29 |
| 6,487,479 B1 | * | 11/2002 | Nelson ........................ 701/29 |
| 6,606,744 B1 | * | 8/2003 | Mikurak ....................... 705/26 |
| 6,691,023 B2 | * | 2/2004 | Fujino ........................ 701/114 |

FOREIGN PATENT DOCUMENTS

WO    PCT/US99/07182    10/1999

OTHER PUBLICATIONS

Eger, Andrew C.: "Reducing repair cycle time", Army Logistician, Sep./Oct. 1997, p. 10.*

* cited by examiner

*Primary Examiner*—Jeffrey A. Smith
(74) *Attorney, Agent, or Firm*—Armstrong Teasdale LLP; William Scott Andes

(57) ABSTRACT

A method, system and apparatus that permit a user to order parts, submit warranty claims, and obtain product and repair information for aircraft engines and aviation parts are described. The system includes a plurality of servers connected through a network and one or more client systems coupled to the network. In another embodiment, the method includes the steps of accessing several database modules, receiving information after the user has been authenticated, updating the centralized database with, receiving an inquiry from a customer to obtain the specific information, and finally retrieving the requested information in response to the inquiry.

20 Claims, 4 Drawing Sheets

METHODS AND SYSTEMS FOR AVIATION PARTS, INFORMATION AND SERVICES

CROSS REFERENCE TO RELATED APPLICATIONS

This application claims the benefit of U.S. Provisional Application No. 60/175,178, filed Jan. 7, 2000, which is hereby incorporated by reference in its entirety.

BACKGROUND OF THE INVENTION

This invention relates generally to customer services, and more specifically to methods and systems for accessing turbine engine aircraft components repair order information and services.

Manufacturers of aircraft engines normally provide repair and inspection services for engine and engine components. However, after an inspection of the engine has been completed, or engine component parts sent in for repair have been repaired, communicating the inspection results to engine owners, e.g. customers, has typically been a time consuming and potentially frustrating process for both the engine manufacturer and the customer. Currently communicating inspection results from incoming inspections of aircraft engines or component parts typically involves reporting the results in tabular form, and submitting the reports to customers via mail or facsimile. In addition, variations in the inspections of different facilities is a source of customer concern.

It would be desirable to provide incoming inspection reports to customers which include information in addition to known tabular reports. Since, customers often desire photographs of damaged components or parts found during the incoming inspections, it would be further desirable to have a system capability that provides customers with photographs of damaged components or parts found during incoming inspections. It would be further desirable to provide quotes for repair services, linkage to new spare parts replenishment, and inspection standardization to reduce variations between repair facilities.

BRIEF SUMMARY OF THE INVENTION

An Aviation Parts and Services System that permits a user to order parts, submit warranty claims, and obtain product and repair information for aircraft engines and aviation parts is described. The system includes a plurality of servers connected through a network and one or more client systems coupled to the network. The servers provide hosting for various pages of an aviation parts and repair services website, and databases of user transactions and information requests. A user interface is provided that allows a user to input and receive information relating to aviation parts and repair services.

In an exemplary embodiment, a method for the automation of parts ordering, warranty claim submission, and dissemination of product and repair information for aviation parts, using an Aviation Parts and Services System is disclosed. The method improves communication to the customer and customer satisfaction. The method includes accessing at least one of an Online Spare Parts Module, an Online Product Support Module, an Online Overhaul Communication Module, an Online Warranty Module, and an Online Component Repair Module located on a plurality of servers of the aviation parts and repair system. In addition, the method includes receiving aviation parts and services information after the user has been authenticated, updating the centralized database with the aviation parts and services information, receiving inquiries from the customer to obtain the aviation parts and services information, and retrieving the aviation parts and services information from the centralized database in response to the inquiry.

In yet another embodiment, an apparatus for ordering parts, submitting warranty claims, and obtaining product and repair information for aviation parts, for internal users and external customers, is disclosed. The apparatus includes a client system, a server system including a plurality of servers and secured based on pre-determined criteria, and a centralized database coupled to the client system and the server system with a communication link. The apparatus also includes an Online Spare Parts Module, an Online Product Support Module, an Online Overhaul Communication Module, an Online Warranty Module, and an Online Component Repair Module, all of which improve customer communication and satisfaction.

DETAILED DESCRIPTION OF THE INVENTION

Figure 1:
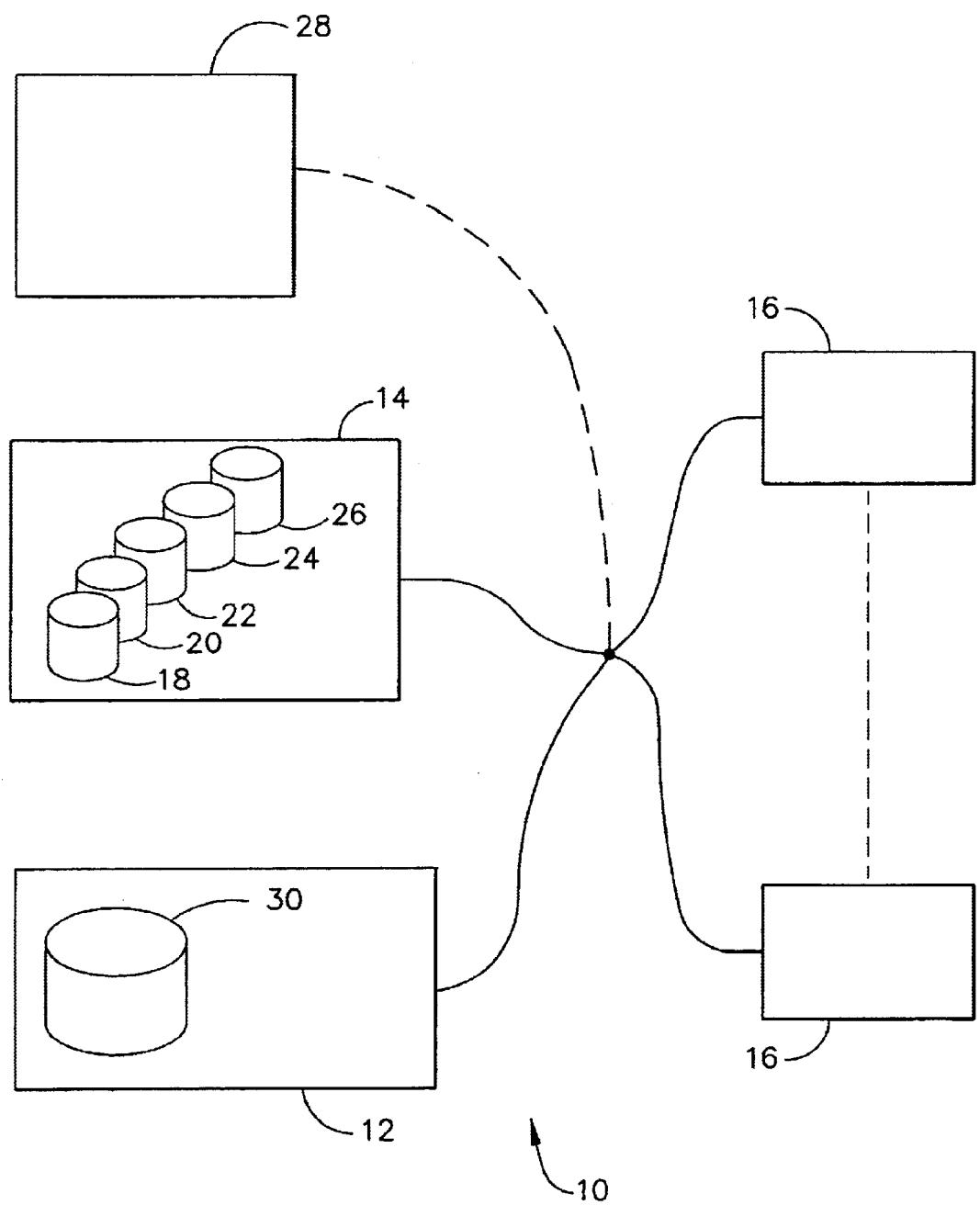
FIG. 1 is a block diagram of an Aviation Parts and Services System (APS)

Exemplary embodiments of systems and processes that facilitate integrated network-based electronic reporting and workflow process management related to Aviation Parts and Services are described below in detail. The systems and processes facilitate, for example, an electronic submission of information using a client system, automated extraction of information, and web-based assessment reporting and management of components, repairs and other services information for system users.

The systems and processes are not limited to the specific embodiments described herein. In addition, components of each system and each process can be practiced independently and separately from other components and processes described herein. Each component and process also can be used in combination with other components and processes.

The Figure is a block diagram of a Aviation Parts and Services System (APS) 10 in accordance with one embodiment of the present invention. System 10 includes a first server 12, a second server 14, and a plurality of client systems 16 connected to servers 12 and 14. In one embodiment, client systems 16 are computers including a web browser. Servers 12 and 14 are accessible to client systems 16 via the Internet. Client systems 16 are interconnected to the Internet through one of man interfaces including, but not limited to, dial-in-connections, cable modems, special high-speed ISDN lines and networks such as local area networks (LANs) or wide area networks (WANs). In another embodiment, client system 16 could be any system capable of interconnecting to the Internet and including a web-based phone or other web-based connectable equipment.

System 10 provides an online interface (Website) whereby customers and repair shops can order parts, submit warranty claims, and obtain product and repair information. First server 12 is configured as a website server that generates HTML documents representing various web pages of the website are accessible by a user using client system 16 equipped with a standard web browser.

Second server 14 includes modules 18, 20, 22, 24 and 26 that define and narrow user transactions and information requests. In one embodiment, modules 18, 20, 22, 24, and 26 are Oracle databases. In another embodiment, second server 14 includes catalogs for spare parts and available repair services. In a further embodiment, second server 14 is configured with an Online Spare Parts Module 18, an Online Product Support Module 20, an Online Overhaul Communication Module 22, an Online Warranty Module 24 and an Online Component Repair Module 26. Access to each module 18, 20, 22, 24 and 26 is secured by user authorization using a light-weight directory access protocol (LDAP). In one embodiment, servers 12 and 14, and client systems 16 communicate with each other through the Internet using TCP/IP protocol. In another embodiment, a spare parts ordering system 28 is connected to system 10. In yet another embodiment, system 28 is, an Integrated Order Management System and Spares System ("ISSES") mainframe and contains databases utilized by businesses to process spare part orders. System 28 is integrated with system 10 as described more fully below.

The LDAP system contains a user profile used to provide secure filter data access and presentation of information that is customized for that user and based on information in the user profile and stored in a database 30. The user profile stores data specific to each user and each user's company. The user profile for each user is created by administrators of server 12, and the information contained in the user profile is not accessible or changeable by the user. Also, specific data that is accessible by the user is restricted based on the user's profile.

Online Spare Parts Module

Access to Online Spare Parts Module 18 is secured by user password. Online Spare Parts Module 18 provides a searchable online catalog for spare parts. Module 18 also allows users to order spare parts and obtain information on those orders.

In one embodiment, functionality of Online Spare Parts Module 18 is provided by an OrderManager™ application licensed from SpaceWorks™, Inc. A standard OrderManager package provides at least one of, a customizable user interface, a fully searchable catalog, order submission, inventory availability, order tracking and account status, order approval, order fulfillment, account-specific pricing, and saved-order templates.

Once a user gains access to module 18, the user can search a catalog database for the desired parts. The catalog database contains information for each part, such as price, catalog lead-time, availability of the part, whether there is an alternate part, whether the part supercedes other parts, whether the part has been superceded by other parts, and history of each part. The user does not search the entire catalog database, but rather, portions of the database are presented to the user which are user specific as dictated by the user profile. Thus, for example, if a user only owns engine model A, only parts for engine model A are presented to the user. The user can search by complete part number or partial part number and wildcard characters.

The user can select parts for purchase and thereby compile an order list. The order lists can be saved on server 14. The user can then retrieve information on these orders such as status of the order, details of the order, and order and shipment confirmation. Moreover, the status of the order can be obtained whether the order was placed through a web interface or through another data exchange format, for example, the Electronic Data Interchange ("EDI") format. EDI is one known standard format for exchanging business data. In one embodiment, the online spare parts catalog is contained in a SPACEWORKS™ Data Warehouse.

Once a user determines the part to be ordered, the user enters the order information through a GUI to the SPACE-WORKS ORDERMANAGER™ application which creates a fixed length flat file containing the order, places the file in an order folder, and sets the status of the order to "In Process". Order folders are checked periodically, e.g., every five minutes, and then flat files containing orders are placed on an incoming order queue. A program is executed on a scheduled basis to retrieve the orders from the incoming order queue, apply business logic to the orders, place the orders according to a mainframe file management system, and produce an acknowledgement file. The acknowledgement file is placed in an outgoing queue, and written to an acknowledgement folder in the ORDERMANAGER™ application. The orders within the mainframe file management system are then added to the ISSES database within system 28. When an acknowledgement file is received on an order, the status of the orders is updated to "Submitted".

Online Product Support Module

Access to Online Product Support Module 20 is secured by user password. Online Product Support Module 20 provides technical documentation online including service bulletins, an illustrated parts catalog, engine shop manuals, standard practices manuals, engine data submittals, and fleet highlights. Availabilit of information is user customized. Thus a user will only be able to access technical documentation for engines and parts which that user already owns.

Technical data contained in the technical documentation provided b Online Product Support Module 20 is typically created and owned by the owner of servers 12 and 14. However, functionality of Online Product Support Module 20, with the exception of dashboard reports described below, may be created and implemented by any service provider of e-publishing solutions, i.e., products and services directed toward putting documentation, such as product support documents, online through a web interface.

Service bulletins provide descriptions of most up-to-date service information for specific engines and parts. Only bulletins relevant to engines and parts owned by that user will be accessible by that user. The bulletins are searchable by keyword.

An illustrated parts catalog ("IPC") provides graphical representations, i.e., GIF images, of parts or components and a parts listing specific to those parts or components. In addition to browsing the images and parts listings, a user may order from a parts listing from within the parts catalog. In one embodiment, a shopping cart icon appears next to each item in the parts listing, and if the user clicks the shopping cart icon, a shopping list window opens to allow the user to build a shopping list within the parts catalog. When the user is done compiling the shopping list from within the parts catalog, the user submits the order by clicking an "Order" button in the shopping list window. The parts catalog is configured to "push" the order to the SpaceWorks OrderManager application as described above.

Module 20 also includes other functions including fleet highlights, engine data submittals, and dashboards. Fleet highlights are reports presented to the user which gives a monthly tally of all repairs done to an engine fleet owned by that user. An engine data submittal ("EDS") is a "birth certificate" for a new engine which lists all the life limited parts when the new engine is created. By accessing Online Product Support Module 20, users can view their EDSs for engines they own through system 10. Dashboards are a graphical report of how effectively the Company is responding to a customer's needs, e.g., repairs are completed on-time 95% of the time. Users will be able to access dashboard reports relating only to engines and parts owned by that user as designated by the user/company specific data in that user's profile.

Online Overhaul Communication Module

Access to Online Overhaul Communication Module 22 is secured b user password. Online Overhaul Communication Module 22 allows customers to obtain information on their engine overhaul jobs after the engines have been submitted to the repair shop. Once an engine is received by the repair shop, service engineers analyze the engines and input data into a central database, using one of servers 12 and 14, with client systems 16 located at the repair shop. Customers can then access this information via Online Overhaul Communication Module 22 through several types of online reports, i.e., dynamically created web pages using data from L databases within servers 12 and 14.

An engine receipt report provides a description of defects with the engine. In addition to a written description, digitized photos of the customer's engine part showing defects needing repair may be stored as part of the databases within servers 12 and 14. Parts are authenticated against engine serial numbers.

A missing-at-incoming report describes whether the engine which was received by the shop is missing any parts. Sometimes a customer takes parts off an engine to use on another engine. Rather than having the customer support manager call the customer for instructions, the missing-at-incoming report is generated. The customer is then given several options, such as buy a new part, or slave at test, i.e., using a part from the shop to run tests on the engine but do not ship the engine with that part, or no disposition, i.e., if the part is not necessary for testing or engine build, then do nothing.

An initial cost estimate report provides an initial cost estimate of the overhaul job. The initial cost estimate is made by the customer service manager and uploaded to databases within servers 12 and 14 via one of client systems 16, located within the repair shop.

An engine status report provides the status of the overhaul job. Customers also have access to an initial findings report made by the shop. When a part comes into the shop, an initial inspection is made to determine the extent to which the part can be repaired—partial repair, full repair, or un-repairable (scrap). The customer can search the databases within servers 12 and 14 through Online Overhaul Communication Module 22 using a repair purchase order. The customer can then access a report, in one embodiment, including a JPEG image of the part, and a description of whether the part requires a partial repair, full repair, or cannot be repaired.

Online Warranty Module

Access to Online Warranty Module 24 is secured by user password. Online Warranty Module 24 allows customers and repair shops to submit warrant claims and view claim information online. The initiator of the claim or a customer representative can edit the claim information prior to submission of the claim. Claim information is restricted by access levels. For instance customers and overhaul shops will only be able to view information for claims they have submitted. Also, access can be restricted for that customer, e.g., the customer manager may be able to view all claims for that customer, but a customer representative may only be able to view claims submitted by that representative. Access is similar for the service side, i.e., Company managers may view all claims, but Company representatives may only view claims for particular customers. Claim information can be retrieved by searching for particular claim numbers or searching on a broad category, such as all claims at a particular status level.

Online Component Repair Module

Access to Online Component Repair Module 26 generally is secured b user password. Online Component Repair Module 26 provides two capabilities, an online catalog and a repair order status. The online catalog allows customers to view which repair services are offered for which parts. The customer can browse the catalog or search by part number or keywords. The customer then receives information such as return time, description of the repair, and new repair information, i.e., repairs which have been developed since the last catalog was issued.

The customer also receives pricing information for the repair. Pricing for repairs may be customized for each customer and access to this customized pricing data is secured. Pricing for the repairs is maintained in a separate data table within one of servers 12 and 14. When the customer searches for a repair job, the system checks who the customer is and then checks if there is a special price for that customer for that repair job. If no special price exists, then the standard catalog price is used.

There is no online ordering of repairs using system 10. The customer still ships into a repair shop the part(s) to be repaired. Once data relating to a repair job is entered into the databases within servers 12 and 14 via one of client systems 16, the customer can retrieve a repair order status report via Online Component Repair Module 26. The customer can retrieve this information by searching for an order number, or other criteria such as all open orders, all shipped orders, all orders for a particular time period, or all open orders with a particular part number.

Module 26 provides contact information allowing the customer to send e-mail to a customer support representative. The customer indicates whether the customer wishes to be contacted via telephone, e-mail, or fax.

Module 26 also provides links to the websites of commercial shippers. For example if a repair order status report indicates that the part has been shipped, but the customer has not yet received the part, a hyperlink to the shipper's website is provided so that the customer can easily access the shipper's site and track the shipment.

Figure 2:
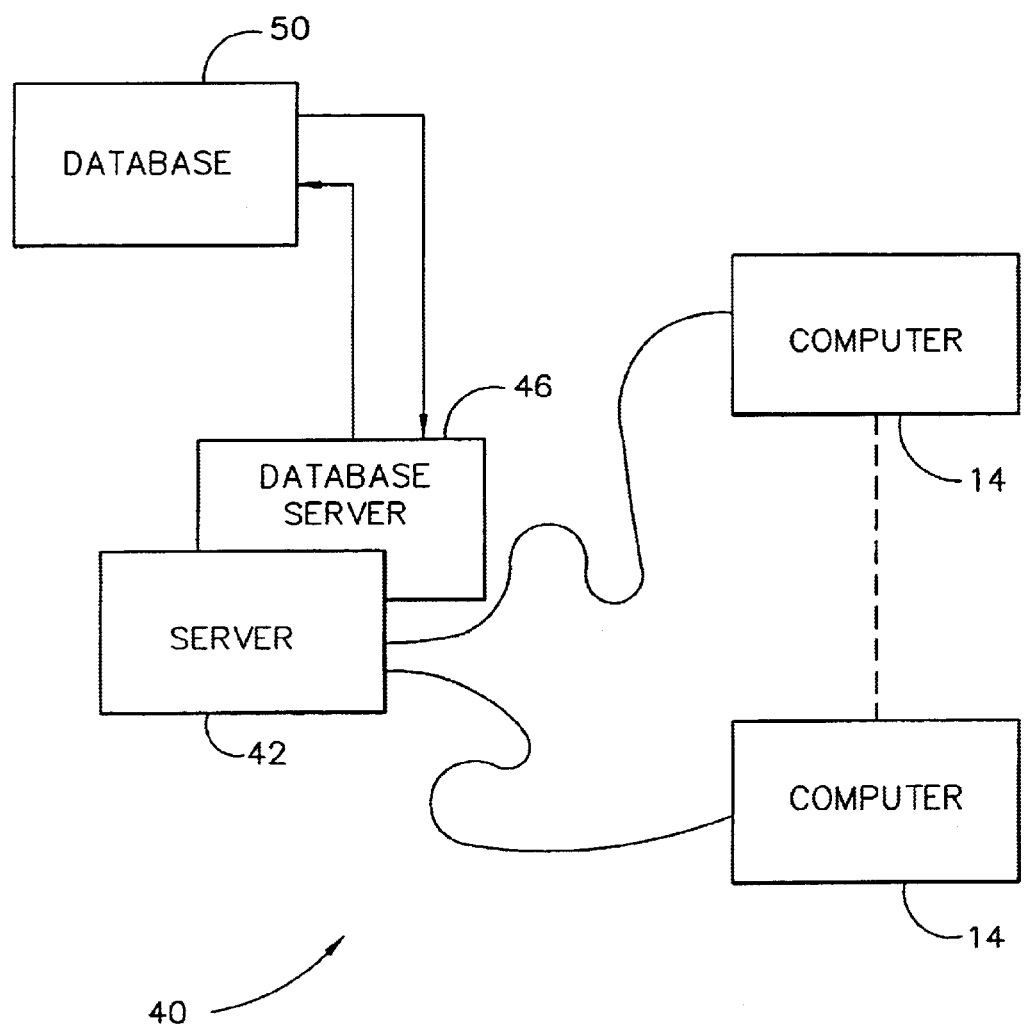
FIG. 2 is a simplified block diagram of the APS.

FIG. 2 is a simplified block diagram of Aviation Parts and Services System (APS) 40 including a server system 42, which includes a plurality of servers, and a plurality of client systems 16 connected to server system 18. Components in system 42, identical to components of system 10 (shown in FIG. 1), are identified in FIG. 2 using the same reference numerals as used in FIG. 1. In one embodiment, client systems 16 are computers including a web browser, such that server system 12 is accessible to client systems 16 via the Internet. Client systems 16 are interconnected to the Internet through many interfaces including a network, such as a local area network (LAN) or a wide area network (WAN), dial-in-connections, cable modems and special high-speed ISDN lines. Client systems 16 could be any device capable of interconnecting to the Internet including a web-based phone or other web-based connectable equipment. A database server 46 is connected to a centralized database 50 containing aviation parts and repair related information on a variety of customers. In one exemplary embodiment, Database 50 includes various Oracle database modules 18, 20, 22, 24, and 26 (shown in FIG. 1), as described above in greater detail. In one embodiment, centralized database 50 is stored on server system 42 and can be accessed by potential users at one of client systems 16 by logging onto server system 12 through one of client systems 16. In an alternative embodiment, 3centralized database 50 is stored remotely from server system 12.

The architectures of system 10, as well as various components of system 10, are exemplary only. Other architectures are possible and can be utilized in connection with practicing the described processes.

Figure 3:
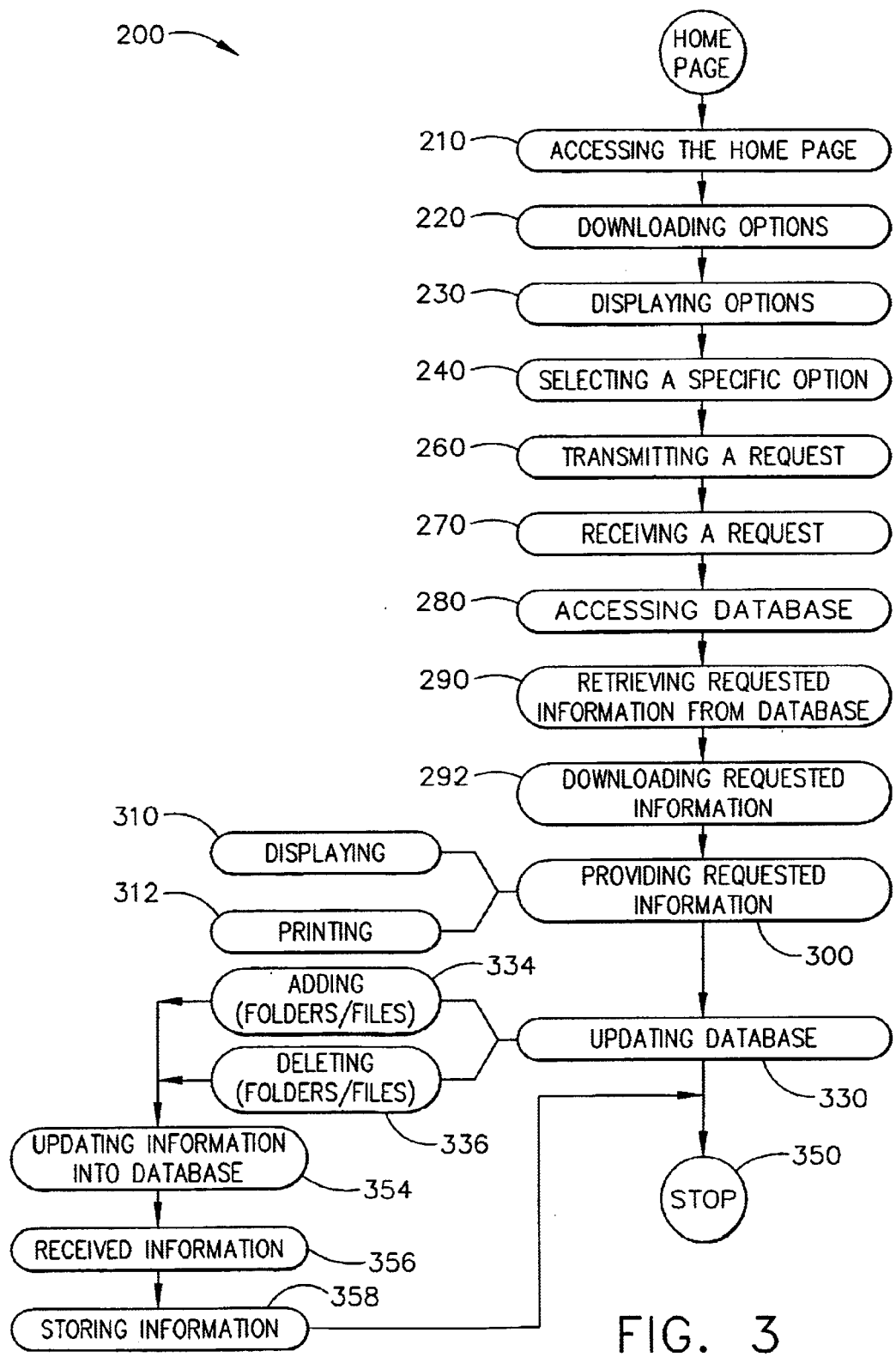
FIG. 3 is a flow chart utilized by the APS.

FIG. 3 is a flow chart 200 utilized by APS 10. Under the web-based system 10 (shown in FIG. 1), the user accesses 210 home page of the web site through client system 16 (shown in FIG. 1). Server system 14 (shown in FIG. 1) downloads 220 and displays 230 several options. Once the user selects 240 a specific option out of various hypertext links, the request is sent to server system 14. Selecting 240 a specific option is accomplished either by click of a mouse or by a voice command. The selected option is transmitted 260 to server system 12. Once server system 12 receives 270 a request, server system 12 accesses 280 databases and applications 18, 20, 22, 24, 26, and 28 (shown in FIG. 1) and retrieves 290 pertinent information from databases (shown in FIG. 1). The requested information is downloaded 292 and provided 300 to client system 16 (shown in FIG. 1) from server 12. Server system 12 provides 300 the requested information to the user by either displaying 310 the information on the user's display or by printing 312 it to an attached or a remote printer. The user continues to search various databases for other information, updates 330 the database 20 by adding 334 folders or files, deleting 336 folders or files to database 20 with new or revised information, or exits 350 from system 10.

Updated information 354 is received 356 by server system 12 for storing 358 in appropriate databases. The user also updates 330 the database 20 by adding, deleting or modifying the information regarding Online Spare Parts Module 18 (shown in FIG. 1), Online Product Support Module 20 (shown in FIG. 1), Online Overhaul Communication Module 22 (shown in FIG. 1), Online Warrant Module 24 (shown in FIG. 1), and Online Component Repair Module 26 (shown in FIG. 1). In another embodiment, client system 16, as well as server system 14, are protected from access by unauthorized individuals. As described, system 10 is an interactive searchable database 50 (shown in FIG. 2) for all aviation parts and services information and provides flexibility to users to stay current with up-to-date information. The system provides the ability for users to directly update, review and generate quotations based on current information and provide up to date information to customers for their review.

Figure 4:
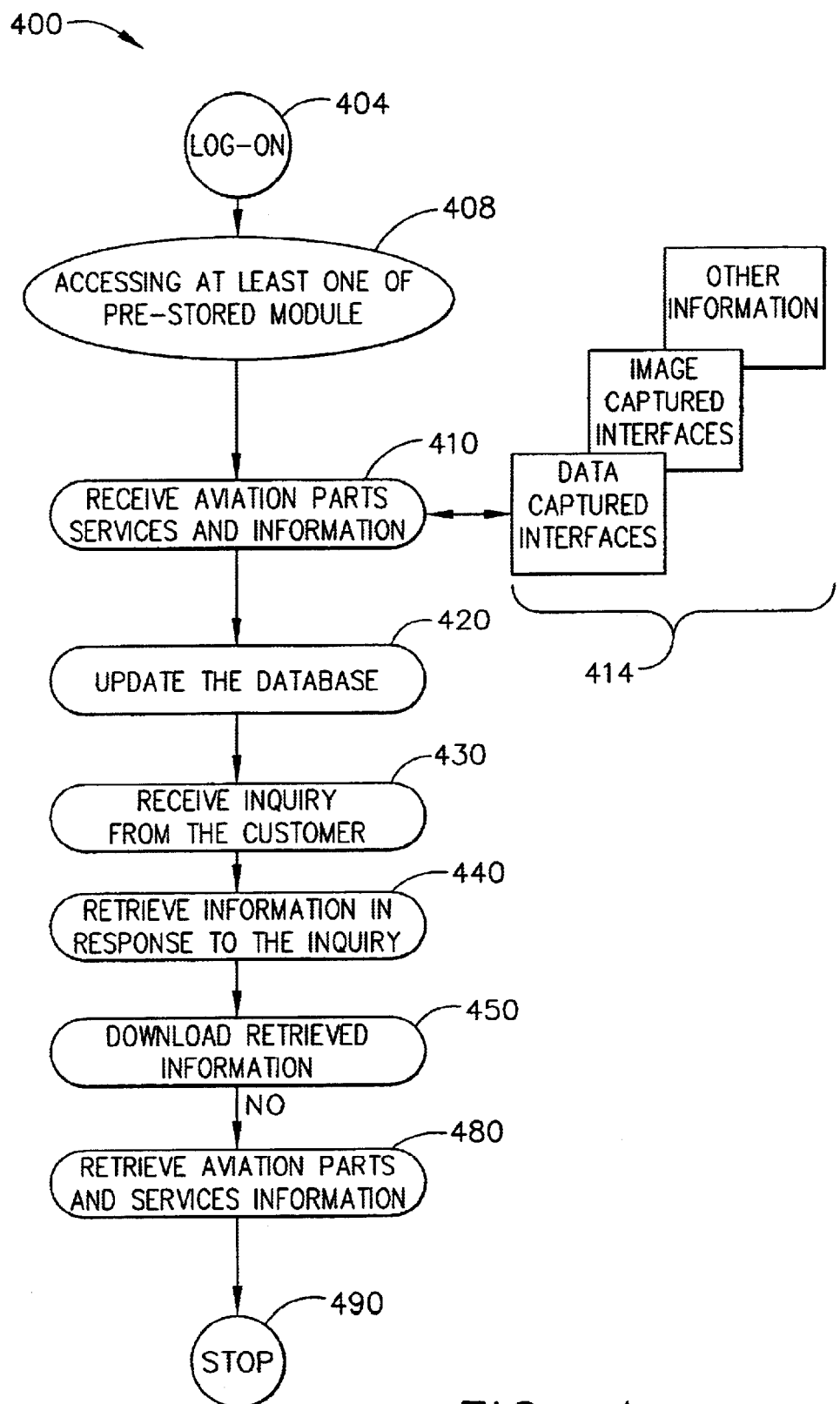
FIG. 4 is yet another exemplary embodiment of a method flow chart utilized by the APS.

FIG. 4 is yet another exemplary embodiment of a method flow chart 400 utilized by the APS 10. The method practiced by APS 10 is a method for accessing aviation parts and services information by internal users and external customers using the Aviation Parts and Services System. Method 400 improves communication and customer satisfaction. Method 400 is practiced by logging 404 onto the system through a network. Method 400 comprises the steps of accessing 408 various databases, and receiving 410 aviation parts and services information. The information that is gathered is gathered via an intranet data capture screen, image capture workstation 414 or simply entering historical or current data into various databases.

Accessing 408 includes accessing at least one of Online Spare Parts Module 18 (shown in FIG. 1), Online Product Support Module 20 (shown in FIG. 1), Online Overhaul Communication Module 22 (shown in FIG. 1), Online Warranty Module 24 (shown in FIG. 1), and Online Component Repair Module 26 (shown in FIG. 1). Accessing further involves accessing sub-components of each of these modules.

Receiving 410 aviation parts and services information includes receiving detailed visual inspection information for aircraft engine component parts submitted for repair as well as costs associated with repairing component parts b parts serial numbers. The information received also includes at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number.

Method 400 further comprises the step of updating 420 the centralized database with the received information, receiving 430 an inquiry from a customer to obtain the inspection information, and finally retrieving 440 the aviation parts and services information from the centralized database by downloading 450 the requested information in response to the inquiry. The information downloaded includes information specific to each module. For example, Online Spare Parts Module 18 retrieves 440 and downloads 450 customers with a searchable online catalog for spare parts; Online Product Support Module 20 retrieves 440 and downloads 450 online technical documentation for engines and parts which customers already own, including valuable information such as service bulletins, an illustrated parts catalog, engine shop manuals, standard practices manuals, engine data submittals, and fleet highlights; Online Overhaul Communication Module 22 retrieves 440 and downloads 450 for customers the information on their engine overhaul jobs once the engines have been submitted to the repair shop including a detail description relating to the type of service required; Online Warranty Module 24 retrieves 440 and downloads 450 for customers warranty claims information. Customers may submit claims using this module and view claim information online; and Online Component Repair Module retrieves 440 and downloads 450 an online catalog and a repair order status configured with search capabilities by part number and key words.

In another embodiment of the invention, once the information is retrieved 440 from the centralized database 50 by downloading 450, the customer reviews and analyzes 480 the information and takes appropriate steps. The retrieved information serves to improve communication with the customer since the customer has access to important business information needed to conduct the on-going business. The customer or the internal user continues reviewing the data or exit 490 from the system. As discussed earlier, system 10 is designed to facilitate communication of aviation parts and services information as well as seek approval from the customer, if needed, through the network to expedite the process.

While the invention has been described in terms of various specific embodiments, those skilled in the art will recognize that the invention can be practiced with modification within the spirit and scope of the claims.

What is claimed is:

1. An aviation parts and repair system for ordering parts, submitting warranty claims, and obtaining product and repair information for aviation parts, for internal users and external customers, to improve communication and customer satisfaction, said system comprising:

a client system accessible by a customer for accessing repair information for the customer's aviation parts that have been returned to a repair facility for refurbishment;

a server system which includes a plurality of servers and secured based on pre-determined criteria, said server system connected to said client system and configured to receive a user identification and an associated password from a user via said client system, said user identification and password enabling a user profile that facilitates customizing an output to the user, said server system further configured with:
  an Online Overhaul Communication Module that is configured to receive engine analysis data for engines undergoing an overhaul process, said engine analysis data including a written description of engine defects and digitized photos of the engine showing defective parts;
  at least one of an Online Spare Parts Module, an Online Product Support Module, an Online Warranty Module that permits a user to edit warranty claim information before submission of the claim and to view warranty claim information online, and an Online Component Repair Module;
a centralized database including aviation parts, repair, and services information for a plurality of customers, said server system configured to be coupled to said device and said centralized database, said server system further configured to:
access at least one of said Online Spare Parts Module, said Online Product Support Module, said Online Overhaul Communication Module, said Online Warranty Module, and said Online Component Repair Module, all modules located on a plurality of servers of the aviation parts and repair system;
receive aviation parts and services information after the user has been authenticated by the aviation parts and repair system based on pre-determined criteria;
prompt the user to input a service engineer's analysis of customer's received engine, said analysis including a serial number for the received engine;
authenticate each engine part using the received engine serial number;
determine engine parts that are missing from the engine when received;
generate a missing-at-incoming report that describes the parts missing from the engine when received;
update the centralized database with the aviation parts and services information;
receive an inquiry from a customer to obtain the aviation parts and services information after the customer has been authenticated by the aviation parts and repair system based on pre-determined criteria; and
retrieve the aviation parts and services information from the centralized database in response to the inquiry.

2. An aviation parts and repair system according to claim 1 wherein said server system configured with the Online Spare Parts Module further provides a searchable online catalog for spare parts and allows users to order spare parts and obtain information on parts orders.

3. An aviation parts and repair system according to claim 2 wherein said Online Spare Parts Module is further configured with an order manager, said order manager further configured with a customizable user interface including at least one of a fully searchable catalog user interface, an order submission user interface, an inventory availability user interface, an order tracking and account status user interface, an order approval user interface, an order fulfillment user interface, an account-specific pricing user interface, and saved order templates.

4. An aviation parts and repair system according to claim 3 wherein said searchable catalog is configured with lead time, part availability, alternative parts, whether the part has superceded other parts, whether or not that part has been superceded by other parts, and the part's history.

5. An aviation parts and repair system according to claim 1 wherein said Online Product Support Module further configured with technical documentation including service bulletins, an illustrated parts catalog, engine shop manuals, standard practices manuals, engine data submittals, fleet highlights, and graphical reports configured to chart responsiveness to customer needs, said technical documentation configured to be user customized customized, and said aviation parts and repair system allowing access to technical documentation for engines and parts which that user already owns.

6. An aviation parts and repair system according to claim 1 wherein said Online Overhaul Communication Module further configured with:
  information on a customer's overhaul jobs once engines have been submitted to the repair facility; and
  information on engineer engine analysis, an engine receipt report, digitized photos of defective parts, a missing-at-incoming report, an initial cost estimate report, and an initial findings report, all related to overhaul jobs.

7. An aviation parts and repair system according to claim 1 wherein said Online Warranty Module configured to:
  allow users and repair shops to submit warranty claims; and
  view claim information, the claim information being access limited by customer.

8. An aviation parts and repair system according to claim 1 wherein said Online Component Repair Module further configured with an online catalog, a repair order status, contact information for receipt of customer E-mail, and links to web sites of shippers, said online catalog configured to allow a user to view what repair services are offered for particular parts, a return time for the repair, a description of the repair, customer customized pricing information for a contemplated repair and information regarding newly developed repairs and said repair order status configured to allow a user to view at least one of order numbers, open orders, shipped orders, orders for a particular time period and all orders for a particular part number.

9. Apparatus for ordering parts, submitting warranty claims, and obtaining product and repair information for aviation parts, for internal users and external customers, to improve communication and customer satisfaction, said apparatus comprising:
  a client system accessible by a customer for accessing repair information for the customer's aviation parts that have been returned to a repair facility for refurbishment;
  a server system which includes a plurality of servers and secured based on pre-determined criteria, said server system connected to said client system and configured to receive information from a user via said client system,
  a centralized database including aviation parts, repair, and services information for a plurality of customers, said server system coupled to said client system and said centralized database by a communication link, said apparatus further comprising:
    an Online Spare Parts Module that provides customers with a searchable online catalog for spare parts;

an Online Product Support Module that provides online technical documentation for engines and parts which customers already own, including at least one of service bulletins, an illustrated parts catalog, engine shop manuals, standard practices manuals, engine data submittals, and fleet highlights;

an Online Overhaul Communication Module that allows customers to obtain information on their engine overhaul jobs once the engines have been submitted to the repair shop including a detail description relating to a type of service required, said Online Overhaul Communication Module configured to:

prompt the user to input a service engineer's analysis of customer's received engine, said analysis including a serial number for the received engine;

authenticate each engine part using the received engine serial number;

determine engine parts that are missing from the engine when received;

generate a missing-at-incoming report that describes the parts missing from the engine when received;

an Online Warranty Module that allows customers and repair shops to submit warranty claims and view claim information online; and an Online Component Repair Module that provides an online catalog and a repair order status configured with search capabilities by part number and key words.

10. Apparatus in accordance with claim 9 wherein the communication link is at least one of a wide area network, a local area network, an intranet and the Internet; said apparatus further configured with a Security Module capable of providing with the access only after the customers are authenticated based on previously stored profiles.

11. A method for the automation of parts ordering, warranty claim submission, and dissemination of product and repair information for aviation parts, using an Aviation Parts and Services System to improve communication and customer satisfaction, the system including at least one server, a centralized database, and at least one client system accessible by a customer for accessing repair information for the customer's aviation parts that have been returned to a repair facility for refurbishment, said method comprising the steps of:

accessing at least one of an Online Spare Parts Module, an Online Product Support Module, an Online Overhaul Communication Module, an Online Warranty Module that permits a user to edit warranty claim information and view warranty claim information online, and an Online Component Repair Module, all modules located on a plurality of servers of the aviation parts and repair system;

receiving a user identification and a password that enables a user profile that facilitates customizing an output to the user;

receiving aviation parts and services information after the user has been authenticated by the Aviation Parts and Services system based on pre-determined criteria;

updating the centralized database with the aviation parts and services information;

prompting the user to input a service engineer's analysis of customer's received engine, said analysis including a serial number for the received engine;

authenticating each engine part using the received engine serial number;

determining engine parts that are missing from the engine when received;

generating a missing-at-incoming report that describes the parts missing from the engine when received;

receiving an inquiry from a customer to obtain the aviation parts and services information after the customer has been authenticated by the system based on pre-determined criteria; and retrieving the aviation parts and services information from the centralized database in response to the inquiry.

12. A method according to claim 11 wherein said step of accessing at least one of an Online Spare Parts Module, an Online Product Support Module, an Online Overhaul Communication Module, an Online Warranty Module, an Online Component Repair Module, further comprises the steps of:

accessing the Online Spare Parts Module which provides a searchable online catalog for spare parts; and allowing the user to order spare parts and obtain information on parts orders.

13. A method according to claim 12 wherein said step of accessing the Online Spare Parts Module further comprises the steps of:

accessing an order manager wherein a fully searchable catalog presented to the user only after the user profile has been validated based on the pre-determined criteria; and then further accessing a customizable user interface including at least one of the fully searchable catalog, an order submission user interface, an inventory availability user interface, an order tracking and account status user interface, an order approval user interface, an order fulfillment user interface, an account-specific pricing user interface and saved order templates.

14. A method according to claim 13 wherein said step of accessing the Online Spare Parts Module further comprises the step of accessing at least one of a part lead time, part availability, alternative parts, whether the part has superceded other parts, whether or not that part has been superceded by other parts, and the part's history.

15. A method according to claim 11 wherein said step of accessing at least one of an Online Spare Parts Module, an Online Product Support Module, an Online Overhaul Communication Module, an Online Warranty Module, an Online Component Repair Module, further comprises the step of accessing the Online Product Support Module which includes at least one of technical documentation including service bulletins, an illustrated parts catalog, engine shop manuals, standard practices manuals, engine data submittals, fleet highlights, and graphical reports configured to chart responsiveness to customer needs, the technical documentation being user customized thereby only allowing access to technical documentation for engines and parts which that user already owns.

16. A method according to claim 11 wherein said step of accessing at least one of an Online Spare Parts Module, an Online Product Support Module, an Online Overhaul Communication Module, an Online Warranty Module, an Online Component Repair Module, further comprises the step of accessing the Online Overhaul Communication Module which includes information on a customer's overhaul jobs once engines have been submitted to a repair shop.

17. A method according to claim 16 wherein said step of accessing the Online Overhaul Communication Module further comprises the step of accessing at least one of an engineer engine analysis, an engine receipt report, digitized photos of defective parts, a missing-at-incoming report, an initial cost estimate report, and an initial findings report.

18. A method according to claim 11 wherein said step of accessing at least one of an Online Spare Parts Module, an Online Product Support Module, an Online Overhaul Communication Module, an Online Warranty Module, an Online Component Repair Module, further comprises the steps of:

accessing the Online Warranty Module configured to allow users and repair shops to submit warranty claims; and viewing claim information, the claim information being access limited by the customer.

19. A method according to claim 11 wherein said step of accessing at least one of an Online Spare Parts Module, an Online Product Support Module, an Online Overhaul Communication Module, an Online Warranty Module, an Online Component Repair Module, further comprises the step of accessing the Online Component Repair Module which includes at least one of an online catalog, a repair order status, contact information for receipt of customer E-mail, and links to web sites of shippers, the online catalog configured to allow a user to view at least one of what repair services are offered for particular parts, a return time for the repair, a description of the repair, customer customized pricing information for a contemplated repair and information regarding newly developed repairs and repair order status configured to allow a user to view at least one of order numbers, open orders, shipped orders, orders for a particular time period and all orders for a particular part number.

20. A method according to claim 11 wherein the server and at least one client system are connected via a network, and wherein the network is one of a wide area network, a local area network, an intranet and the Internet.

\* \* \* \* \*